(12) United States Patent
Beirne

(10) Patent No.: US 12,085,969 B2
(45) Date of Patent: Sep. 10, 2024

(54) TopSink: LIQUID STORAGE DEVICE WITH AUTOMATIC DISCHARGE IN HIGH VOLUME BATCHES

(71) Applicant: Daniel James Beirne, Rockford, MI (US)

(72) Inventor: Daniel James Beirne, Rockford, MI (US)

(73) Assignee: Daniel James Beirne, Rockford, MI (US)

( * ) Notice: Subject to any disclaimer, the term of this patent is extended or adjusted under 35 U.S.C. 154(b) by 253 days.

(21) Appl. No.: 17/821,443

(22) Filed: Aug. 22, 2022

(65) Prior Publication Data

US 2024/0061451 A1    Feb. 22, 2024

(51) Int. Cl.
  G05D 9/02    (2006.01)
  B65D 6/40    (2006.01)
  B65D 8/00    (2006.01)

(52) U.S. Cl.
  CPC .............. *G05D 9/02* (2013.01); *B65D 7/045* (2013.01); *B65D 7/40* (2013.01)

(58) Field of Classification Search
  CPC .. G05D 9/02; B65D 7/045; B65D 7/40; E03B 2001/047; E03B 3/03
  See application file for complete search history.

(56) References Cited

U.S. PATENT DOCUMENTS

| | | | | |
|---|---|---|---|---|
| 5,220,755 A * | 6/1993 | Roles | ...................... | E04D 13/08 24/19 |
| 5,407,091 A * | 4/1995 | Wallis | ...................... | E03B 3/03 220/501 |
| 5,730,179 A * | 3/1998 | Taylor | ...................... | E03B 3/03 137/376 |
| 8,578,976 B1 * | 11/2013 | Davis | ...................... | E03B 3/03 52/12 |
| 2005/0257433 A1 * | 11/2005 | Dussault | ................. | E04D 13/08 52/12 |
| 2010/0155340 A1 * | 6/2010 | Fuller | ...................... | E03B 3/03 210/776 |
| 2010/0288375 A1 * | 11/2010 | Thomas | .................. | E04D 13/08 137/376 |
| 2024/0061451 A1 * | 2/2024 | Beirne | ...................... | G05D 9/02 |

FOREIGN PATENT DOCUMENTS

| | | | | |
|---|---|---|---|---|
| EP | 1469138 A1 * | 10/2004 | ............. | E03B 3/02 |
| GB | 2270009 A * | 3/1994 | ............. | E03F 5/106 |
| JP | 3187625 U * | 12/2013 | | |

* cited by examiner

*Primary Examiner* — Bob Zadeh

(57) ABSTRACT

TopSink is an automatic drainage device that includes a floatable funnel with a flexible discharge line connected to a discharge port on an interior of a barrel. The funnel rises with the level of the collected water and or rain until it nears the barrel's maximum capacity, when it is triggered to sink and drain out a predetermined volume of water. As the funnel sinks it continues to drain water until it is caught by at least two predetermined depth adjustable rods. The catch rods establish how much water is drained from the barrel each time capacity is reached. Water or rain continues to drain from the TopSink until the water or rain level gets to the level of the catch rods. Upon further water or rain collection, the funnel begins to float again on the surface of the water, until capacity is reached again.

4 Claims, 8 Drawing Sheets

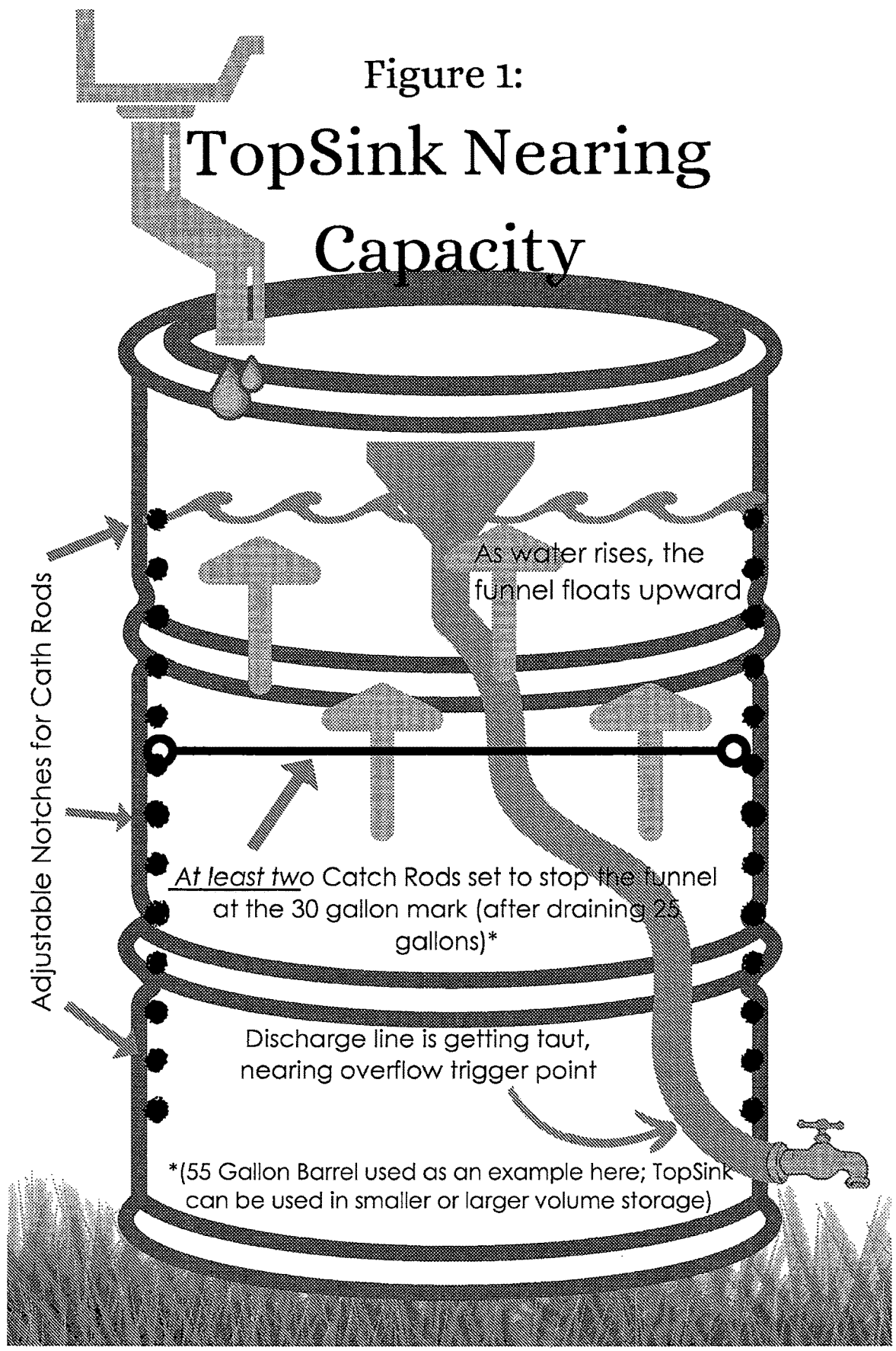
Figure 1: TopSink Nearing Capacity

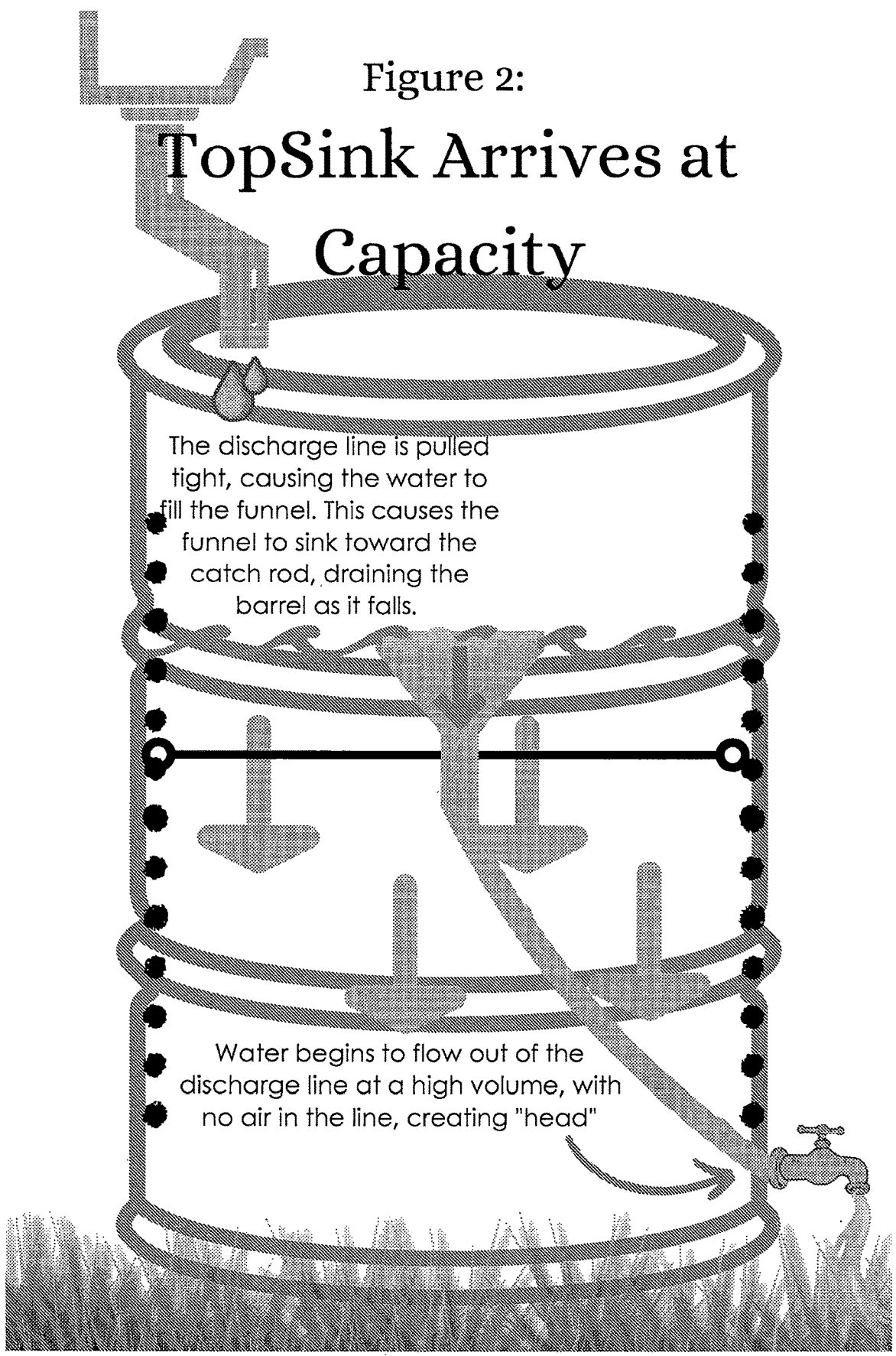

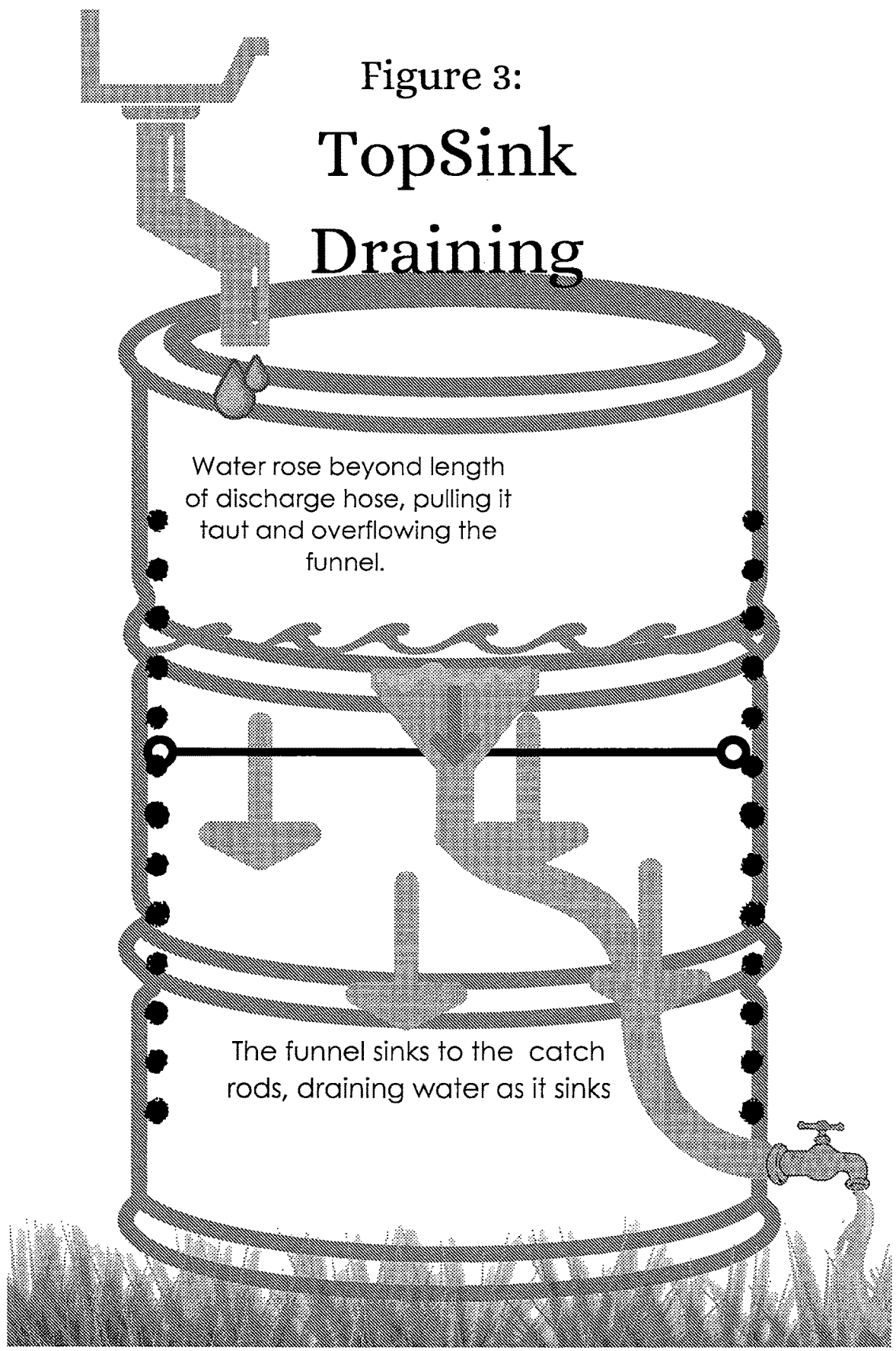

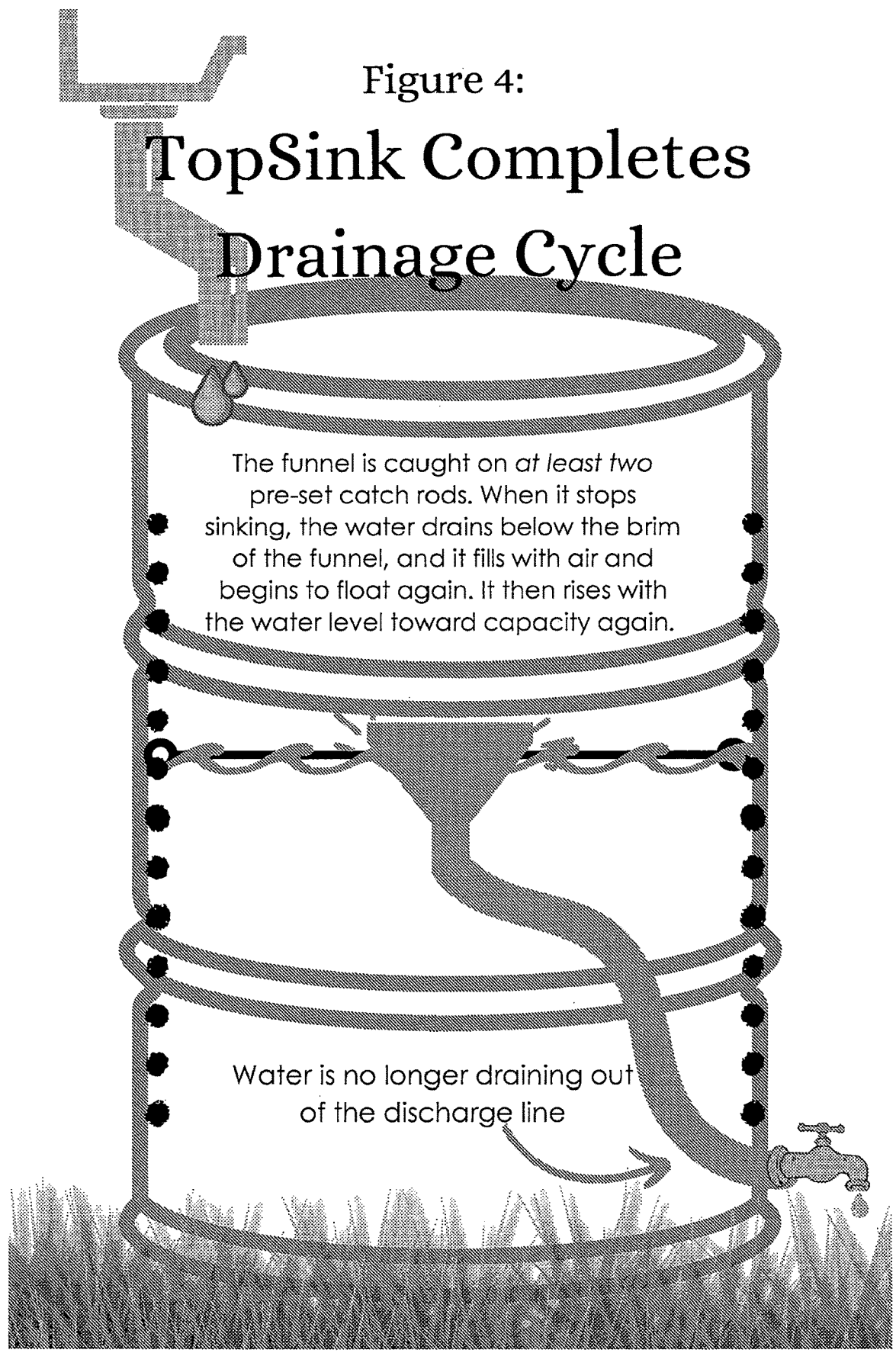

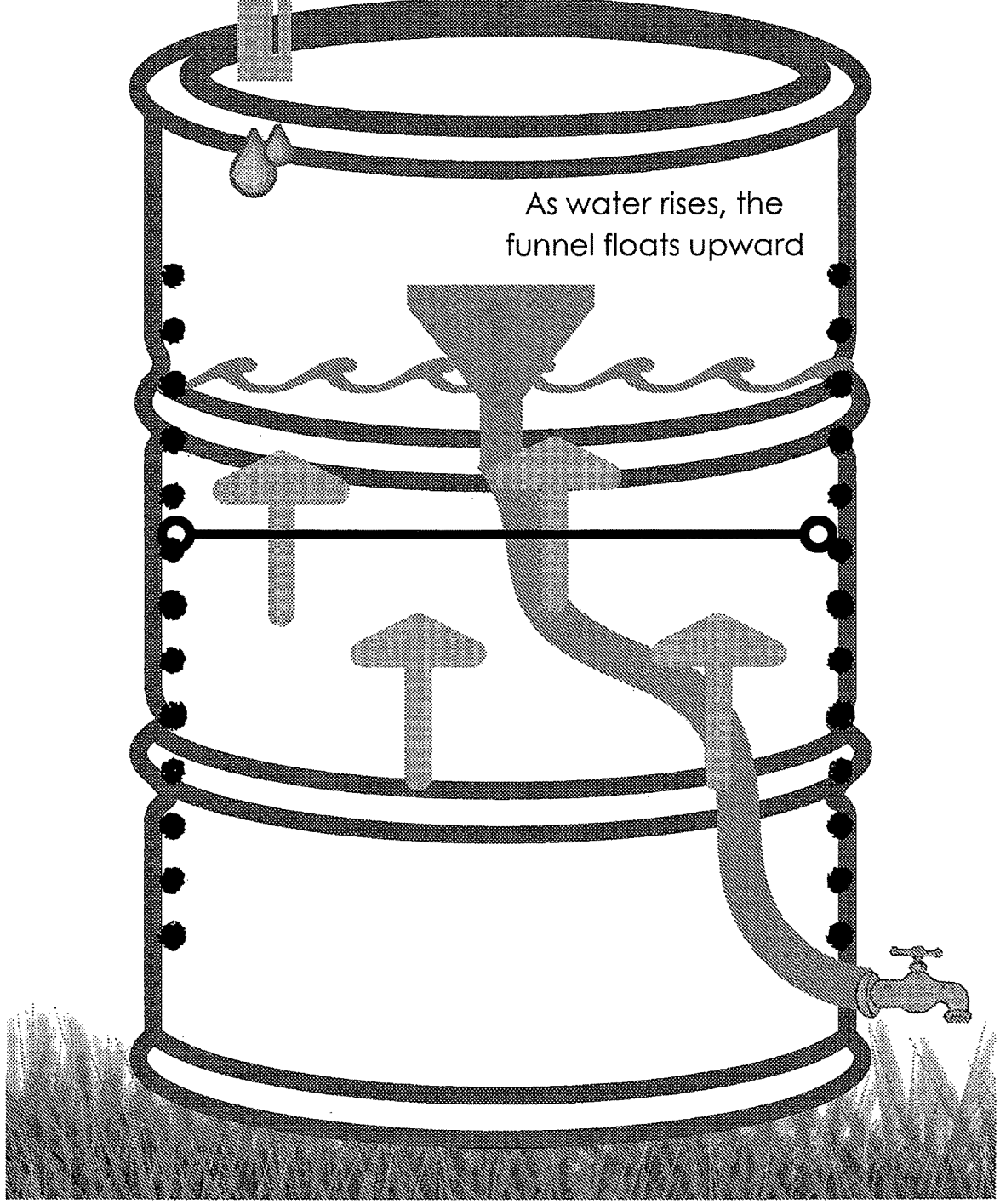
Figure 5: TopSink Returning to Surface

Figure 6:
Waterflow without TopSink (air in the line)

As water trickles down the line, it pools in any dips. With no further volume to pull it over the incline, and with air absorbing any helpful pressure, the water remains in the line.

This prevents water from having enough energy to power over an incline when traveling down a hose. The water would back up in the line, preventing adequate drainage.

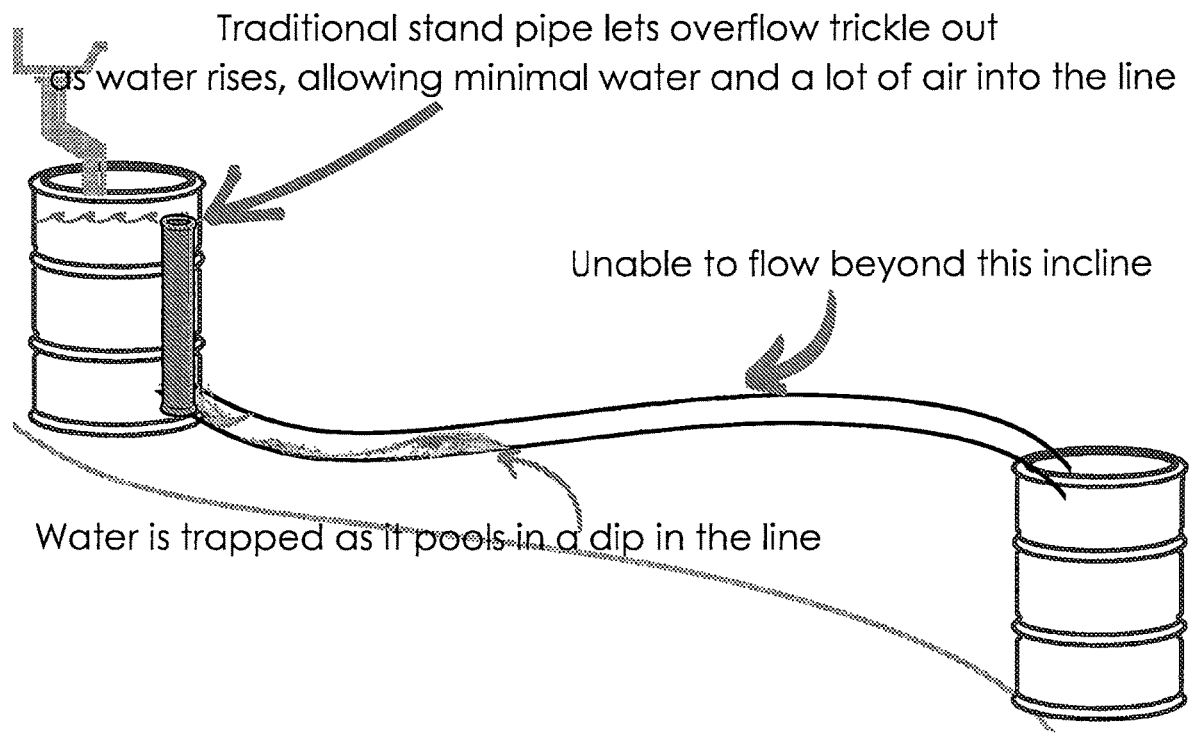

Traditional stand pipe lets overflow trickle out as water rises, allowing minimal water and a lot of air into the line Unable to flow beyond this incline Water is trapped as it pools in a dip in the line

Figure 7:

Waterflow *with* TopSink (NO air in the line=head)

With excess water released in high volume batches, TopSink removes the air from the discharge line and creates optimal "head." (Head is the measurement of how much water can move against gravity.

The less air in the line, the higher the volume of water flowing in the line, and the longer the tube, the higher the head. TopSink increases the head in the line and therefore enables discharged water to travel a further distance, even over an incline.

Water flows with ease over this incline, Arriving to desired offsite location with no external inputs (like electricity)

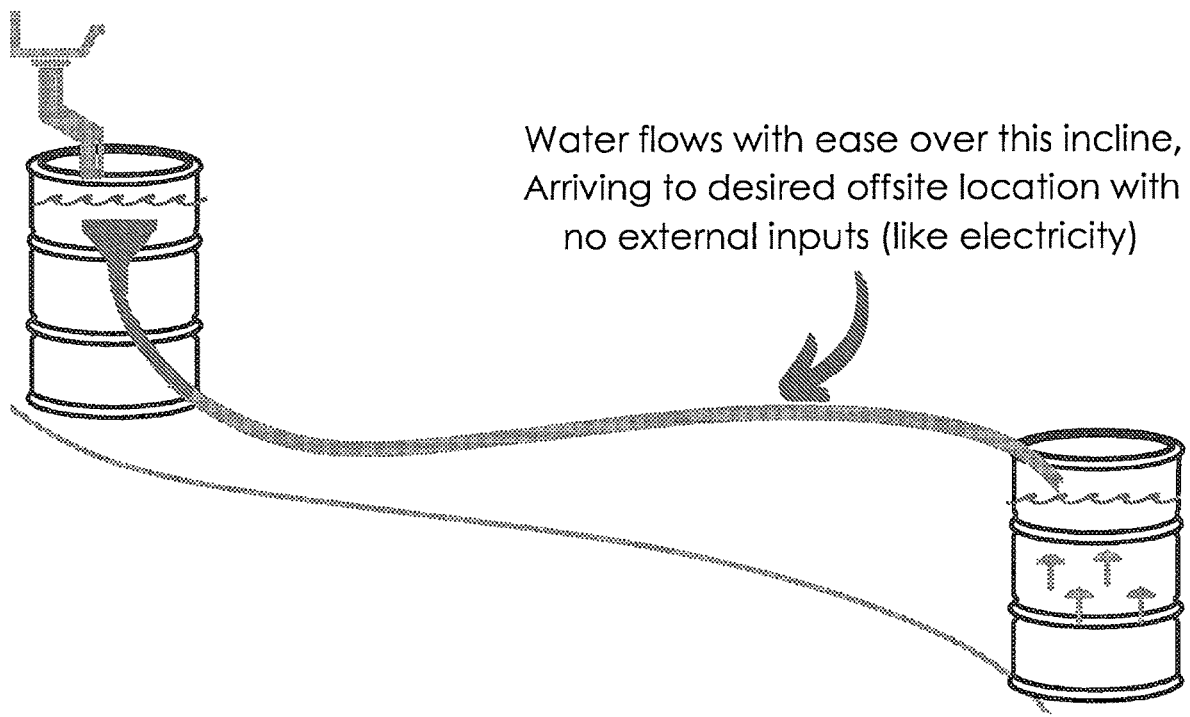

TopSink: a Closeup

US 12,085,969 B2

TopSink: LIQUID STORAGE DEVICE WITH AUTOMATIC DISCHARGE IN HIGH VOLUME BATCHES

CROSS-REFERENCE TO RELATED APPLICATIONS

NOT APPLICABLE

Statement Regarding Federally Sponsored Research or Development (if Applicable)

NOT APPLICABLE

Reference to Sequence Listing, a Table, or a Computer Program Listing Compact Disc Appendix (if Applicable)

NOT APPLICABLE

BACKGROUND OF THE INVENTION

TopSink is useful in the area of water catchment, storage, and use. As in the case of rain barrels and watering crops or a garden, for example. It is a device that uses the energy and weight of stored water to move that same water across a distance or over an incline, with no external input.

Any amount of stored water acts like a battery; it is stored energy waiting to be used. This is why many towns pump their public water high into a tower. In the event that the power goes out, water can still flow to residents' homes through the pull of gravity. TopSink works under the same premise. This stored energy is called hydrostatic pressure. Despite this rich potential energy on even small scales, consumer options for rain water storage and collection do not include any means of harnessing this opportunity.

When the typical DIY or store-bought rain barrel design reaches capacity, its overflow-if it is equipped with one at all—is merely a stand pipe that enables surplus water to trickle out of the barrel before the barrel itself overflows. This barrel from Home Depot, for example, is one of the more popular—and more expensive-options for the consumer, and its overflow design is customary across many other rain barrel options. The trickle of water produced by the overflow in barrels like this is unusable, in terms of energy generation, because the air in the discharge line absorbs any pressure or suction that would otherwise give the flowing water force.

Herein lies the problem: These rain barrel designs waste the potential energy of stored water, leaving the laborious moving of said water entirely up to the physical effort of the person(s) using it, or requiring the use of external inputs like electricity.

This problem presents an opportunity: If a device existed that could release a large pre-determined amount of water all at once, when capacity is reached, then the rushing flow in the discharge line would be unweakened by air and be able to carry itself further, even over an incline (as long as the final destination is lower than the point of origin).

TopSink does exactly that. The device is triggered when water storage reaches its full capacity, and then it releases all at once a pre-determined large volume of water. 5 gallons, 10 gallons, 20 gallons, etc. By releasing many gallons at once, instead of releasing a slow steady trickle, the large volume of water in the discharge line dramatically increases the "head" of the flow. Head is the measurement of how high water can move against gravity; it is a combination of momentum and suction in the line. The more water moving in a line, and the less air in the line, the stronger the head. With more optimal head, TopSink turns an otherwise useless trickle of excess water into a force that can surge up an incline or power a hydraulic ram pump (which uses head to pump water uphill).

On its own, without the aid of a pump, TopSink can move water across a distance and even up an incline if its final destination is still lower than the point of origin. If this same amount of excess water were released as a trickle, instead of a burst of higher volume, the water would pool and the air in the line would absorb any force that would have enabled it to power over a hill.

This idea was first envisioned in the spring of 2022, when I had collected an abundance of rainwater along the gutters of my home, but was unable to transport it easily across the yard to my garden or fruit trees. My options were to run a hose between barrels when there was enough water to create head in the line, or to carry 5 gallon buckets between the locations. Both of these options were labor intensive and, since I was not transferring the water during a rain storm, I would miss out on the dozens of gallons of water per barrel that were discharged through the overflow line during the storm.

"If only the barrel would release its overflow in 5 gallon batches, there would be enough head for the water to carry itself through the hose to the barrels in the garden!" I thought. Then, after some experimentation, a repurposed funnel and some plumbers putty, a working model was created.

BRIEF SUMMARY OF THE INVENTION

TopSink is an automatic drainage device that floats on the surface of the water in a rain barrel or other storage device. It rises with the level of the water until it nears the barrel's maximum capacity, when it is triggered to sink and drain out a predetermined volume of water. When the barrel is filled to capacity, the discharge line is pulled taught which causes it to be overtaken by the water, filling up and quickly sinking. As it sinks it begins to drain the barrel rapidly. The funnel then continues to sink and drain until it is caught by the two catch rods, which are set to an adjustable, predetermined depth. The catch rods establish how much water is drained from the barrel each time capacity is reached. Water continues to drain from TopSink until the water level gets to the level of the catch rods. Then, the funnel begins to float again on the surface of the water, until capacity is reached again. By releasing a large volume of water all at once, the overflow has more power in the discharge line, enabling water to travel to a desired location without the need for external inputs like electricity.

BRIEF DESCRIPTION OF THE SEVERAL VIEWS OF THE DRAWING

FIG. 1: TopSink Nearing Capacity
TopSink's discharge line is nearly taut, as the water in the barrel reaches capacity
FIG. 2: TopSink Arrives at Capacity
Capacity has been reached and the flexible discharge line is pulled taut, causing the modified funnel to become submerged, beginning the draining cycle as it sinks.
FIG. 3: TopSink Draining
With the funnel now submerged and sinking, water actively rushes into the funnel and flexible discharge line, expelling water as the funnel sinks toward the two catch rods. As the funnel drains from beneath the surface, no air enters the discharge line, increasing the head.

FIG. 4: TopSink Completes the Drainage Cycle

Figure 8:
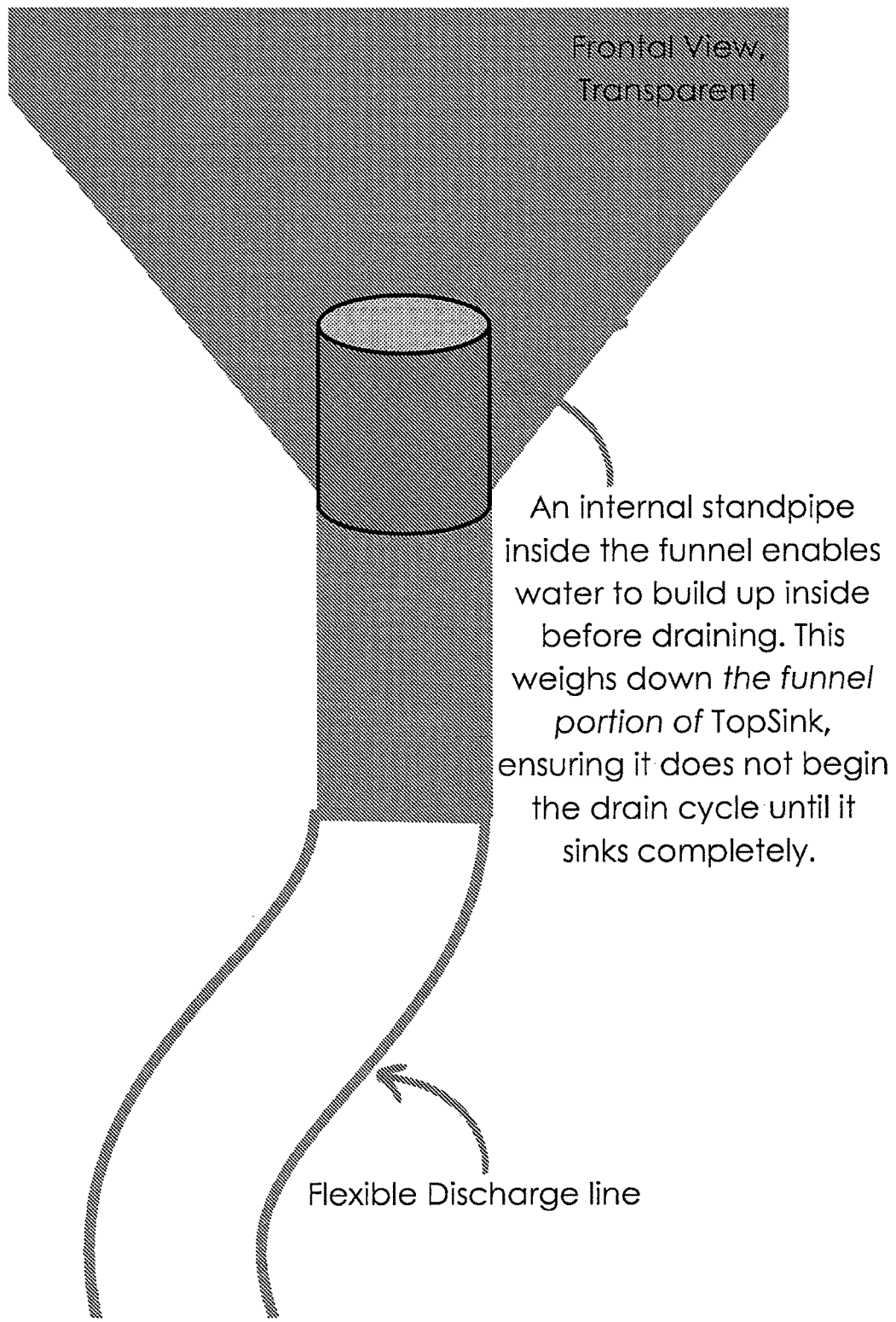

The funnel now rests on the catch rods and, no longer sinking, the water stops draining at this predetermined depth. The drainage cycle is complete.

FIG. 5: TopSink's Funnel Returning to Surface

Floating again, with no water in the line, the funnel now rises with the water level toward capacity once again.

FIG. 6: Water flow without TopSink-air in the line

In this drawing, it can be seen how air in a discharge line prevents water from flowing with any force FIG. 7: Water flow with TopSink-no air in the line In this drawing, it can be seen how increased head in the line (minimal air and maximal water) amplifies the force of the water, even over an incline FIG. 8: TopSink-a Closeup on the Funnel This figure offers a frontal, transparent, view of the modified funnel that makes TopSink function. It shows the prominent standpipe in the center of the funnel which ensures the funnel does not sink until it is sufficiently weighed down, guaranteeing it completes the drainage cycle all at once without unwanted drops of water entering the line between cycles.

DETAILED DESCRIPTION OF THE INVENTION

In the simplest terms, TopSink is a floating, modified, funnel attached to a flexible discharge line on the inside of a rain barrel.

From top to bottom, TopSink consists of a floating, modified funnel inside any type of water storage. The funnel is connected to a flexible discharge line which connects to a port on the side of the barrel. Just outside the barrel, this port has a shut off which can be used to turn TopSink's drainage cycles on or off. This shut off is connected to a hose that runs to the desired destination for the water, like another barrel or a reservoir away from the house.

The modified funnel floats when the water in the barrel is below capacity because the funnel and the discharge line are filled with air so they float like an empty bottle.

When the water in the storage container approaches capacity, TopSink's discharge line is pulled taught, anchoring the brim of the funnel as the water continues to rise. The water eventually overtakes TopSink's modified funnel and the funnel quickly fills with water and sinks. There is a short standpipe inside the funnel, which enables water to build up in the funnel before it begins to drain. This gives the funnel added weight before it sinks and begins to drain, which makes for a quicker trigger point once capacity is reached.

When the funnel sinks, water quickly begins to flow out of it through the discharge line. Since the line is submerged now, no air enters the system, creating optimal "head" in the discharge line. This is TopSink's primary function and advantage, and where it is differentiated from more traditional overflow designs; it releases enough water at once to create flowing force in the discharge line.

TopSink's funnel sinks from the surface all the way down to a preset catch rods. The catch rods can be set to stop the funnel after discharging 5 gallons, 10 gallons, 15 gallons . . . all the way up to 30 gallons of release.

From the catch rods, TopSink continues to drain the barrel until the water level falls just below the funnel's new location. Then, the brim begins to rise above the surface of the water, and as the last of the drained water gurgles out of the funnel and discharge line, the funnel begins to float on the surface of the water as it rises again. No water is flowing out of the discharge line at this time because its opening is above the surface of the rising water.

Whether the water level continues to rise from the current rain storm, or the next one weeks later, TopSink's funnel will stay afloat on the surface until it reaches capacity again, when the cycle will begin again.

TopSink provides the following advantages:

1. TopSink's primary advantage, as discussed, is that it creates head in the discharge line, which can be used to power the water over an incline, across a distance, or to power a hydraulic ram pump. It enables water to automatically be moved between two locations, with topography in between.
2. Because TopSink releases the excess water from the surface of the water, it skims off any surface scum, algae, or mosquito larvae that may have developed on the water when it was still. In doing so, TopSink drastically reduces the amount of harmful algae, mosquitoes or pests that can be associated with long term water storage. This can be a particularly advantageous detail in settings where algae and mosquitoes carry disease in water supplies.
3. TopSink releases the excess water from the top portion of the barrel, as opposed to the bottom. This increases the buoyancy level of the discharged water, adding several more feet of height to the final destination to which the water may flow. In other words, the water is released from a higher height than if it were merely released from the bottom of the barrel, which translates into potential flow over that many more feet of incline. If TopSink is set to release 5 gallons of water each time the barrel reaches capacity, for example, this means it releases that water from the 50 gallon mark-very near the top of the barrel. In a typical 55 gallon barrel, that is more than 3 feet higher than the bottom of the barrel. This means that the discharged water may now reach a destination that is up to 3 feet higher than if it were released from the bottom of the barrel.

The invention claimed is:

1. A liquid storage device comprising:
   a sealed liquid storage container;
   a floatable funnel inside of said liquid storage container having a top and bottom opening, an internal standpipe attached to the bottom opening within a base of the floatable funnel;
   a flexible discharge line connected to the bottom opening of said floatable funnel and extends to a port on a side of an interior of said liquid storage container;
   a shut off valve on an exterior of said liquid storage container, connected to an end of said flexible discharge line via the port;
   the liquid storage container includes intermittent indentations at varying depths inside said liquid storage container, and at least two adjustable rods are attached across the intermittent indentations at a desired depth, wherein the floatable funnel rests on between the at least two adjustable rods when the floatable funnel completes a drainage cycle.

2. The A liquid storage device of claim 1, wherein a length of said flexible discharge line extends to a height of a maximum capacity of said liquid storage container.

3. The liquid storage device of claim 2, wherein the floatable funnel floats prior to the liquid storage container reaches the maximum capacity and collects and discharges the liquid at the maximum capacity via the flexible hose to the port and valve.

4. The liquid storage device of claim 1, wherein the internal standpipe inside the floatable funnel enables liquid to build up inside the internal standpipe ensuring the floatable funnel not begin the drain cycle until the floatable funnel sinks completely.

\* \* \* \* \*